US005581408A

United States Patent [19]

Schumtz et al.

[11] Patent Number: 5,581,408
[45] Date of Patent: Dec. 3, 1996

[54] METHOD AND APPARATUS FOR DEFLECTING AN OPTICAL BEAM

[75] Inventors: Lawrence E. Schumtz, Watertown; Craig M. Schiller, Arlington, both of Mass.

[73] Assignee: United Technologies Corporation, Hartford, Conn.

[21] Appl. No.: 242,192

[22] Filed: May 13, 1994

[51] Int. Cl.$^6$ ................................................ G02B 27/10
[52] U.S. Cl. ........................................ 359/622; 359/621
[58] Field of Search .................................. 359/434, 435, 359/619, 621, 622

[56] References Cited

U.S. PATENT DOCUMENTS

| | | | |
|---|---|---|---|
| 3,484,599 | 12/1969 | Little | 359/622 |
| 3,592,529 | 7/1971 | Juhlin | 359/628 |
| 3,657,981 | 4/1972 | Benton | 359/736 |
| 4,168,900 | 9/1979 | Adachi | 359/619 |
| 4,448,499 | 5/1984 | Tokumaru | 359/619 |
| 5,270,859 | 12/1993 | Wirth | 359/622 |
| 5,291,334 | 3/1994 | Wirth | 359/622 |
| 5,392,140 | 2/1995 | Ezra | 359/619 |
| 5,430,562 | 7/1995 | Fushimi | 359/40 |
| 5,463,498 | 10/1995 | Gal | 359/622 |
| 5,479,026 | 12/1995 | Schmutz | 250/568 |

Primary Examiner—Georgia Y. Epps
Assistant Examiner—Ricky Mack
Attorney, Agent, or Firm—McCormick, Paulding & Huber

[57] ABSTRACT

A method and apparatus for inducing deflections in a collimated optical beam using a microptic multiplet (MOM) optical system wherein a first microptic lens module (MLM) receives a collimated optical beam and provides it to a second microptic lens module (MLM) whose lenslet optic axes are displaced relative to the lenslet optic axes of the first MLM by an amount yielding the desired optical beam deflection.

32 Claims, 6 Drawing Sheets

METHOD AND APPARATUS FOR DEFLECTING AN OPTICAL BEAM

TECHNICAL FIELD

The field of the invention is that of optical micro-lenses, and in particular combinations of arrays of micro-lenses that form a micro-lens module deflector optical system.

CROSS REFERENCE TO RELATED APPLICATIONS

Some of the subject matter hereof may be disclosed and/or claimed in the following commonly owned, copending applications which are incorporated herein by reference: "A Micro-Lens Panoramic Imager", U.S. Ser. No. 07/827,794 and "An Optical Instrument With Micro-Lenses", U.S. Ser. No. 07/828,268.

BACKGROUND OF THE INVENTION

Arrays of small lenses having a diameter on the order of one millimeter are referred to as micro-lenses and have been made in a number of ways and used for a variety of purposes. An array of micro-lenses has been matched to an array of pixels on a television screen or other raster imaging device. Another use, such as that illustrated in "Agile Beam Steering Using Binary Optics Microlens Arrays", by W. Goltsos and M. Holz, Optical Engineering Vol 29 No. 11, page 1392, is for steering a collimated beam of monochromatic radiation through an angle by translating one of a pair of binary micro-lens arrays that combine to form an array of Galilean telescopes. The beam is required to be monochromatic because binary micro-lenses are highly dispersive.

A variety of optical systems can be formed from select configurations of micro-optic multiplets (MOM) comprised of two or more microlens modules (MLM). The MLM's themselves are formed from planar arrays of micro-lenses. With these optical systems a single primary image is formed together with a set of images transversely displaced from an optic axis. MOM's are characterized by the property that the image distance and the object distance move in the same direction, in stark contrast to known lens systems. For example, when an object distance decreases, the corresponding image distance also decreases with the present optical system.

A panoramic imaging system is formed from select configurations of micro-optic multiplets (MOM) comprised of two microlens modules (MLM). The MLM's themselves are formed from arrays of micro-lenses. These panoramic imaging systems are characterized by the two MLM's configured on concentric, approximately spherical surfaces. The optic axis of each of the micro-lenses is tilted slightly with respect to its neighbor to allow for proper alignment of images to form a single primary image on a substantially spherical global image surface.

It would be advantageous to utilize pairs of micro-lens arrays configured as MOM'S to scan input radiation by deflection either lateral, angular or combinations thereof, in a controlled manner. The present optical system is drawn towards such an invention.

SUMMARY OF THE INVENTION

An object of the present invention is to provide for an optical system that induces a calibrated deflection in a collimated optical beam.

Another object of the present invention is to provide an optical system of the foregoing type comprised of monolithic lens modules (MLM).

Another object of the present invention is to provide an optical system of the foregoing type capable of rastering an optical beam across an area of a target surface.

It is another object of the present invention to provide a method and apparatus for deflecting an optical beam with arrays of microlenses (lenslets) so as to scan an optical beam in a desired pattern.

Another object of the present invention is to provide an optical system of the foregoing type configured as an optical telescope.

Still another object of the present invention is to provide an optical system of the foregoing type configured in tandem pairs of optical telescopes.

Another object of the present invention is to provide an optical system of the foregoing type comprised of a micro-optic multiplet (MOM) having a second MLM whose position is adjustable.

Still another object of the present invention is to provide an optical system of the foregoing type comprised of an MOM with preset displacements of a second MLM of a varying degree according to a zone occupied by the MOM.

Still another object of the present invention is to provide an optical system of the foregoing type comprised of MOM's that permit image scanning.

Another object of the present invention is to provide an optical system of the foregoing type comprised of MOM's that produce J and O beam deflection for use in rastoring an output beam.

Still another object of the present invention is to provide an MOM of an optical system of the foregoing type comprised of MOM's that produce a radial deflection resulting in a circular scan for a plane normally intersecting a scan cone so generated.

Another object of the present invention is to provide an optical system of the foregoing type comprised of MOM's that employ a rectangular relative input beam rastoring accomplished either by rastoring the beam rectangularly or by rastoring the MOM's rectangularly.

Yet another object of the present invention is to provide an optical system of the foregoing type comprised of MOM's that employ cylindrical rastoring.

Still another object of the present invention is to provide an optical system of the foregoing type comprised of MOM's that consist of rectangular arrays of various shaped lenslets.

Another object of the present invention is to provide an optical system of the foregoing type that comprises MOM's consisting of polar arrays of variously shaped lenslets.

Another object of the present invention is to provide an optical system of the foregoing type which comprises MOM's bearing curvilinearly mappings of otherwise rectilinearly described patterns of lenslets.

Yet another object of the present invention is to provide an optical system of the foregoing type comprised of MOM's which employ intermediate lenses as relay or field lenses.

According to the present invention, a micro-optic multiplet (MOM) optical system for deflecting radiation transiting substantially parallel to a radiation optic axis includes a first input lenslet array for receiving the radiation. The first lenslet array has a plurality of input lenslets each having a focal length, a pitch, a lens diameter and a lenslet optic axis substantially parallel to said radiation optic axis. There is a second output lenslet array for outputting the radiation which has a plurality of output lenslets each having a focal length, a pitch, a lens diameter and a lenslet optic axis substantially parallel to the radiation optic axis. Each of the output lenslets have a corresponding input lenslet. The deflection generation apparatus provides displacement of the second lenslet array relative to the input lenslet array from a first position, wherein said output and corresponding input lenslet optic axes are in registration and said radiation transits through the optical system propagating substantially along said radiation optic axis, to a second position wherein said output and corresponding input axes are misregistered and the radiation is deflected from said radiation optic axis to propagate along an output axis forming an angle J thereto by an amount proportional to the separation between said first and second positions.

DESCRIPTION OF THE PREFERRED EMBODIMENT

Figure 1:
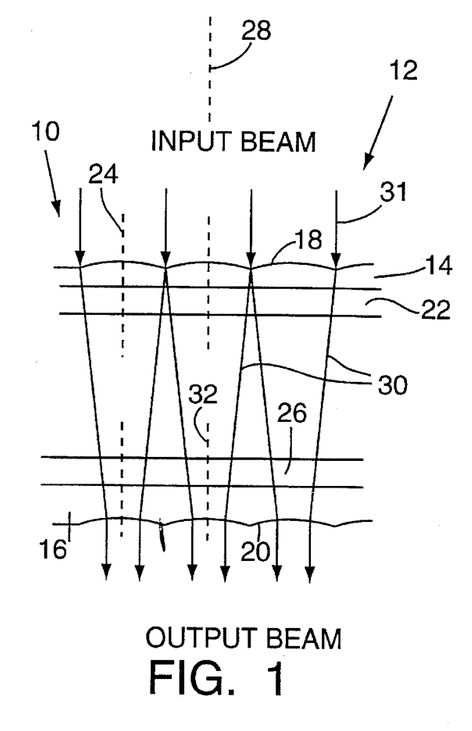
FIG. 1 is a simplified schematic illustration of a portion of a monolithic optical multiplet (MOM) incorporating a pair of monolithic lenslet modules (MLM) provided according to the present invention.
Figure 2:
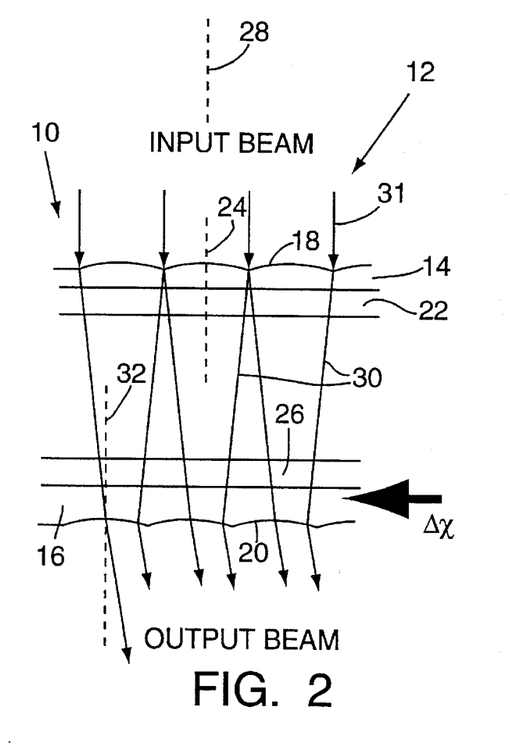
FIG. 2 is an illustration of the MOM of FIG. 1 displacing a received optical beam.

Referring now to FIGS. 1 and 2, there is illustrated an optical system 10 including a micro-optic multiplet 12 (MOM), which comprises a set of at least two modules 14, 16 (MLM) of micro-lenses. MLM 14 has an array of micro-lenses 18 of diameter $d_1$ and focal length $f_1$. MLM 16 is comprised of an array of micro-lenses 20 of diameter $d_2$ and lens focal length $f_2$. The micro-lenses are alternatively referred to as lenslets. In system 10, the diameter of the lenslets 18 and 20 are equal.

The MLM's are made from known materials such as optical epoxy, glass, silica, or zinc selenide preferably deposited on a substrate such as substrate 22. The substrate is typically glass or other optically transparent material. The lenslets are each characterized by a lenslet optic axis 24. The MLM 16 can be deposited on an opposed surface of a substrate or, as in the case of FIG. 1, on a surface of a separate substrate 26.

MLM 14 is spaced apart from MLM 16 by a selected distance along a beam axis 28. The lenslets 20 in the embodiment of FIG. 1 are negative and each transmit a portion of a beam 30 from a corresponding one of lenslets 18. The focal length $f_2$ of each lenslet 20 is chosen to provide a magnification M defined as for traditional Galilean telescopes as $$M = -f_1/f_2 \tag{1}$$

where $$f_2 < 0. \tag{2}$$

For re-collimation, we require $$M = f_1 - |f_2|, \tag{3}$$

where M is the separation between lenslets, by equation 2 we have $$M = f_1 + f_2. \qquad (4)$$

Now, equation 1 can be re-arranged as $$f_2 = -f_1/M \qquad (5)$$

so $$M = f_1(1 - 1/M). \qquad (6)$$

We now have the necessary design parameters to fabricate an assembly 12 yielding a desired magnification M for a given focal length $f_1$ or $f_2$. The magnification may be chosen to reduce or eliminate losses due to over-filling lenslets 20.

The MLM's are configured in FIG. 1 to have their optic axes in registration with a MOM axis 31, allowing the beam to be directly transmitted through the optical system without displacement or loss of optical energy aside from Fresnel (reflection) losses.

The conditions required to form an image with MOM optical systems are detailed in the aforementioned copending U.S. patent applications. In sum, a MOM does not have an optic axis in the same sense that a conventional lens does. For purposes of forming an image, the MOM optic axis is taken to be a perpendicular drawn from the image to the MOM. For a collimated beam, the axis of the beam will be taken as the optic axis.

MOM's also behave very differently from pairs of conventional glass lenses. A relationship corresponding to the lens maker's formula is given by the following equation:

$$\frac{1}{C} = \frac{Q}{R} \frac{1}{S} + \frac{1}{F_{eff}} \qquad (7)$$

In this equation, C is the distance from the right hand lens array to the image, S is the distance from the object to the first lens array, Q is the ratio $f_1$ divided by $f_2$, R is the ratio $d_1$ divided by $d_2$, and $F_{eff}$ is the effective focal length of the array. The effective focal length is defined as the distance between a microlens module and the focus of an input collimated beam. It may be either positive or negative.

Those skilled in the art will immediately appreciate that the plus sign in this equation results in properties very different from that of the classic lens maker's formula as given by equation 7:

$$\frac{1}{i} = \frac{1}{f} - \frac{1}{o} \qquad (8)$$

where o is the object distance to a lens, i is the image distance to the lens and f is the focal length of the lens. In the classic lens maker's formula, when the object distance is increased, the image distance is decreased; i.e., the two distances move in opposite directions. The opposite is true with a MOM.

MOM 12 may be characterized by 5 parameters: $f_1$, $f_2$, $d_1$, $d_2$, and the spacing $h_1 + h_2$. A corresponding set of global parameters: C (image distance), S (object distance), $M_t$ (transverse magnification), $S_{pn}$ (spurious image spacing), and $F_{eff}$ (effective focal length). It is apparent to those skilled in the art that there is a five-dimensional "parameter space" that permits flexibility in design.

It is possible to change the spacing of the lenslets of the second MLM relative to the first. The behavior of a MOM with MLM's whose lenslets of different respective pitch (or spacing) may be understood as follows. When the rays progressively further off of the lenslet axis are considered, the rays from the centers of the first MLM's lenslets pass through the second MLM's lenslets at progressively increasing distances. As a result, they are deviated through progressively increasing angles. If the second MLM's lenslets are closer together, the rays strike further and further outside the lenslets centers and are deviated more and more in the direction of the lens centers. Since the angle of deviation depends linearly on the distance from the axis of alignment, these rays all cross that axis and each other at one point. This point defines the overlap plane of the MOM.

If the second MLM's pitch is greater than that of the first, then the deviation of the rays is in the opposite sense. If these diverging rays are traced back they define a virtual overlap plane in front of the MOM. The differential pitch of the two arrays thus leads to a global optical power for the MOM. This converging or diverging power is superimposed on the imaging properties of each lenslet pair.

Alternatively, the second MLM can be displaced relative to the first. For the present application "displacement" refers to the relative translation between MLM's. This translation can be achieved in a moveable manner as seen by the system of FIG. 2 which generates a corresponding beam deflection of variable magnitude. Alternatively, one MLM can be fixedly displaced relative to another as in the embodiments of later Figures which generates a fixed beam deflection of proportional magnitude. Consider the set of rays from an object at infinity that strike a MLM. The particular rays that pass through the center of the lenslets of that MLM are not deviated thereby. If a second MLM of identical pitch is now placed in the beam and the centers of the lenslets aligned with the centers of the lenslets of the first MLM, it too will have no effect on the rays. If, however, the second MLM is displaced slightly, each ray will then be deviated through some angle determined by the relative displacement of the two MLM's. The fact that the displacement may be pre-set in a number of zones or marks a point of adjustable departure of the present invention over the prior art. The second MLM may also contain positive lenslets, as we describe later. The relationship between MLM displacement and beam deflection is shown schematically with respect to FIG. 2 wherein MLM 16 is displaced laterally in the Figure relative to MLM 14. Lenslet optic axis 32 is displaced and the optical beam is deflected accordingly.

The angle J of beam deflection resulting from this displacement Dx is given by $$J = Dx/F_n \qquad (9)$$

where $F_n$ is the focal length of the negative lenslet and the minus sign indicates that, for $F_n < 0$ (negative lenslet focal length), beam deflection is in the opposite direction from lenslet displacement.

Those skilled in the art will note that beam deflection may be generated using relative translation of a second MLM as compared to the first, or MLM's with different pitch. Deflection of a selectable magnitude can be accomplished by a translation device or by fabricating MLM's in arrays of fixed deflection or detailed herein.

For a collimated beam impinging on the two lens system illustrated in FIG. 2, a relationship can be formulated between the transverse displacement of the second MLM and the angle of the exiting beam, which is also assumed to be collimated. By employing conventional ray analysis techniques to analyze ray behavior through the two lenslets and the separating medium, the incremental effect of each element on ray position and slope can be shown, and the deflection angle expected from the system shown in FIG. 2 can be determined. For simplicity, ideal thin lenses are separated by air, although a rigorous derivation is possible for thick lenses and other media. In general, a ray from an input beam arriving at arbitrary position $r_{in}$ and with an arbitrary slope $r'_{in}$ leaves an ideal thin lens with a slope $r'_{out}$ and position $r_{out}$ according to $$r'_{out} = r'_{in} - f(r_{in}, F), \text{ and} \tag{10}$$

$$r_{out} = r_{in'} \tag{11}$$

where F is the focal length of the lens and both $r_{in}$ and $r_{out}$ are measured from the optic axis of the lens to the transverse position of intersection with the lens. For a homogeneous medium, the corresponding relations are $$r'_{out} = r'_{in'} \tag{12}$$

$$r_{out} = r_{in} + d \cdot r'_{in'} \tag{13}$$

where d is the distance travelled in the medium.

Figure 22:
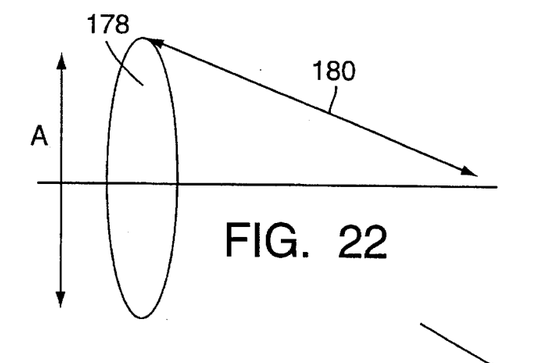
FIG. 22 is a simplified diagrammatic illustration showing the behavior of a marginal ray in a two-lens combination.

To specialize the analysis to the present two lens combination, the behavior of a marginal ray through a first lens, a homogeneous medium, and a second lens is analyzed. First, the effect of a first lens 178 as illustrated in FIG. 22 is characterized. Defining $r'_1$ as the slope of ray 180 after leaving the first positive lens with focal length $F_1$ and diameter A, it is seen that, because $r'_{in}=0$ (the input beam is collimated and arrives with zero slope), $$r'_1 = -\frac{A_1/2}{F_1}. \tag{14}$$

Figure 23:
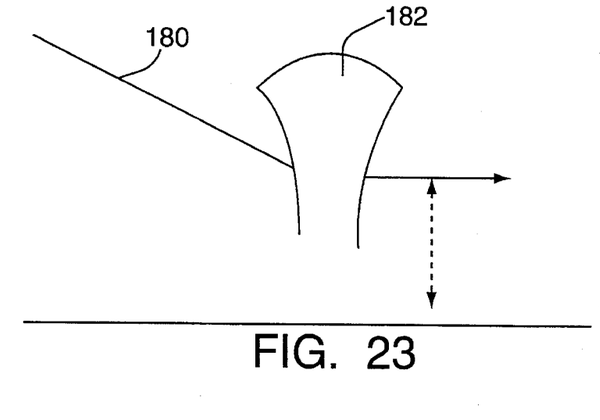
FIG. 23 is a simplified illustration of a marginal ray entering a negative lens.

FIG. 23 illustrates the same ray starting at height A/2 above the optic axis and traversing a distance d, arriving at a second negative lens 182 at height h above the optic axis. The value of h is found by $$h = \frac{A}{2} + r'_1 d, \tag{15}$$

and from Equation 14, $$h = \frac{A}{2}\left(1 - \frac{d}{F_1}\right) \tag{16}$$

Figure 24:
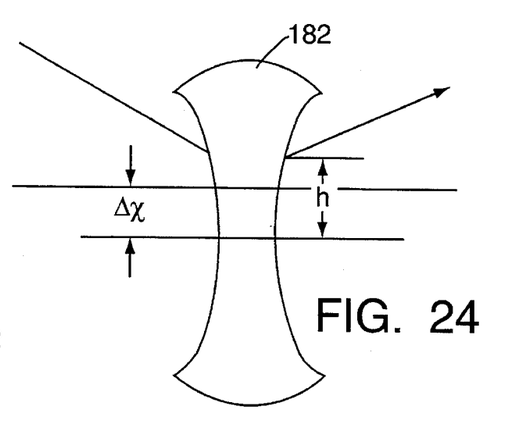
FIG. 24 is a second illustration of the lens of FIG. 23 illustrating the translation of marginal ray therethrough.

To determine the slope of the ray exiting lens 182, its focal length $F_2$ (which is negative) is used as is the incident ray slope $r'_1$, and the height $r_1$ above the center of lens 182 where the ray impinges on lens 182. For a translation $\Delta x$ as shown in FIG. 2 and FIG. 24, the value of r, as illustrated in FIG. 24, is simply the sum of h and $\Delta x$, $$r_1 = h + \Delta x, \tag{17}$$

or, by Equation 16 above, $$r_1 = \frac{A}{2}\left(1 - \frac{d}{F_1}\right) + \Delta x. \tag{18}$$

Inserting these values into Equation 10, we find $$r'_2 = -\frac{A/2}{F_1} - \frac{\frac{A}{2}\left(1 - \frac{d}{F_1}\right) + \Delta x}{F_2} \tag{19}$$

or $$r'_2 = -\frac{A}{2}\left(\frac{1}{F_1} + \frac{1 - \frac{d}{F_1}}{F_2}\right) - \frac{\Delta x}{F_2}, \tag{20}$$

which reduces to $$r'_2 = -\frac{A}{2F_1 F_2}(F_1 + F_2 - d) - \frac{\Delta x}{F_2}. \tag{21}$$

Note that this relationship can be further simplified by constraining the output beam to be collimated. This means that $$F_1 - F_2 = d \tag{22}$$

and since $F_2 < 0$, $$d = F_1 + F_2. \tag{23}$$

Therefore, $$r'_2 = -\frac{\Delta x}{F_2},$$

where the negative sign indicates that the motion of the deflected beam is opposite that of the MLM translation. The solution for the deflection angle J can be expressed as $$\theta = \tan^{-1}\left(-\frac{\Delta x}{F_2}\right), \tag{25}$$

but for small angles, simply $$\theta = -\frac{\Delta x}{F_2}. \tag{26}$$

Figure 3:
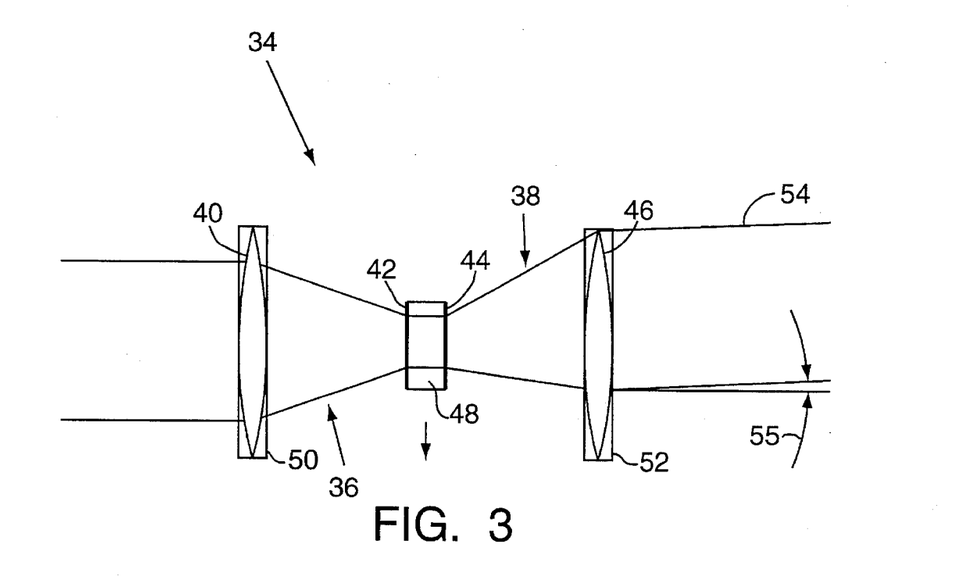
FIG. 3 is a simplified schematic illustration of an optical system provided according to the present invention comprised of MOM assemblies configured as pairs of Galilean telescopes.

Since the output angle 55 in the system of FIG. 3 is equal to the intermediate angle, the same expression holds for the system 34 as well.

FIG. 3 schematically illustrates an alternative optical system 34 comprising matched pairs of Galilean (non-inverting) telescopes. Pseudoscopic imaging attendant to multiple inverting telescopes is avoided with optical systems 10 and 34, whereas system 34 avoids crosstalk, over-fill of lenslets 40, 42 and 44, and re-enlarges the beam. Therefore, this embodiment of the present invention is most useful in imaging applications. Optical system 34 comprises first and second telescopes 36, 38 respectively comprising lenslets 40, 42 and 44, 46. The optical system 34 is characterized by substrate 48 on which is situated MLM's 42 and 44. MOM's 40 and 46 are located on separate substrates 50 and 52. The two telescopes serve as a beam compression/beam expansion system. Since the negative elements of both telescopes are mounted on one substrate 48 which is translatable, moving this central substrate has a strong effect on beam angle such that displacement of substrate 48 causes the collimated output beam 54 to be laterally displaced as well as turned through an angle 55. The exiting beam angular deflection is equal to the intermediate beam angle to the preservation of incident angle by telescope 38. The beam angular deflection may be computed from Equation 16 as well.

Figure 4:
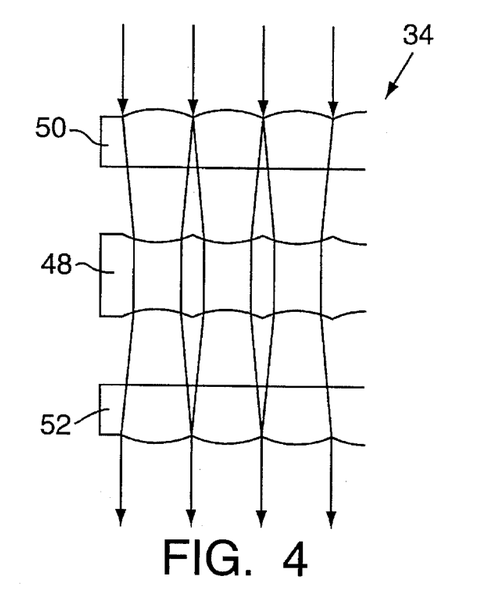
FIG. 4 is a detailed view of a portion of the optical system of FIG. 3 illustrating ray paths in the absence of deflection.

Those skilled in the art will note that deflection as used herein includes both lateral and angular displacement as well as a combination of these such as provided in the optical system of FIG. 3. The relative speeds of the positive and negative lenses can be chosen to minimize vignetting and crosstalk. FIG. 4 is an expanded schematic illustration of the optical system 34 showing individual ray paths. Those skilled in the art will note that optical system 34 is characterized by minimal insertion loss for small displacement and high fill-factor.

The system 10 of FIG. 1 is also a multiple telescope system, but MLM 14 comprises the positive lenslet array and MLM comprises the negative lenslet array. This optical system is easy to fabricate but since the exiting beam from each telescope is reduced in diameter, the beam fill factor is reduced. Note that in both optical systems 10 and 34 or others employing inverting telescopes, it is possible to alter the thickness of a common substrate or lenslet separation instead of altering the focal length of the lenslet in the different MLM's.

Figures 5, 8:
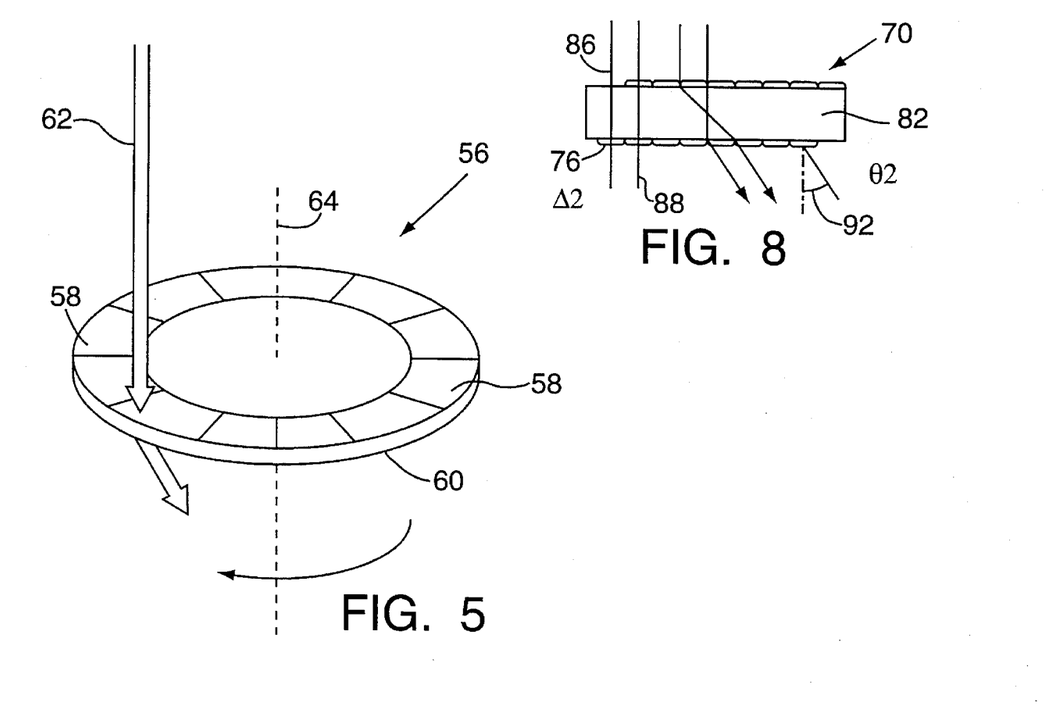
FIG. 5 is a perspective illustration of an optical system provided according to the present invention characterized by a plurality of MOM's each generating a fixed beam displacement.
FIG. 8 is a sectioned illustration of a third MOM of the optical system of FIG. 5.

FIG. 5 is a schematic illustration in perspective of an indexed deflector optical system 56 provided according to the present invention. The indexed deflector system comprises a series of MOM's 58 spaced about an annular carriage 60. The deflector optical system induces a sequence of calibrated deflections in a collimated optical beam 62 as the optical system is rotated about axis 64.

As shown in section in FIGS. 6–8, MOM's 66, 68 and 70 each are comprised of MLM's as detailed hereinabove. The telescopes may be Galilean or Keplerian however, MLM's 72, 74 and 76 which provide the output beam have their respective lenslet optical axes displaced by a fixed, selected amount such that as the optical beam sequentially transits the MOM's of the optical system, it will undergo a series of progressively greater deflections. In the embodiment shown with respect to FIGS. 5–8, the beam is repetitively scanned across a line in an image plane (not shown). Often non-inverting telescopes are chosen for imaging applications.

Figure 6:
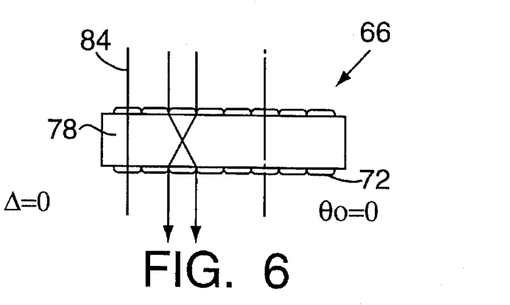
FIG. 6 is a sectioned illustration of a first MOM of the optical system of FIG. 5, where a Keplerian telescope is shown to exemplify the fact that either inverting or non-inverting systems may be employed.
Figure 7:
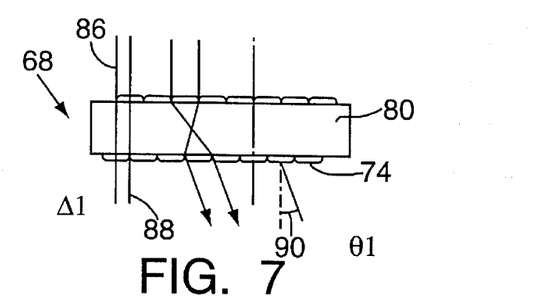
FIG. 7 is a sectioned illustration of a second MOM of the optical system of FIG. 5.

The lenslets of each upper and lower MLM's which comprise the series of MOM's are deposited on opposed surfaces of respective MOM substrates 78, 80 and 82 shown in FIGS. 5–7. The output MLM's are fabricated such that the lenslet axes of the output MLM's are displaced progressively at greater angles as compared to the input MLM's to generate the desired deflection. In FIG. 6, the input and output MLM's have their respective lenslet optical axes in registration (line 84). The displacement is equal to zero and, therefore, the deflection angle is also equal to zero. In FIG. 7 the output lenslet axes 86, 88 have been displaced by a value $D_1$. Consequently, the deflection angle 90 as compared to the input axes is $J_1$. Similarly in FIG. 8, the displacement is now $D_2$, yielding beam displacement angle 92. Focal lengths of each lenslet are $F_s$ as measured in the substrate material, not in free space. The parameter S is the segment or lenslet number. Substrate thickness is given by equation $T=2F_s \cos J_s$, so that for a constant thickness, $F_s=\frac{1}{2} T/\cos J_2$. The tangent of J therefore is $D_s/T$ where T is the substrate thickness. It should be clear that analogous scanners can be fabricated with telescope pairs as detailed in FIG. 3.

As the optical system is rotated, the MOM's repetitively pass through the optical beam, generating a scan consistent with the calibrated deflection such that the collimated output beam is deflected at a fixed angle relative to the input optical beam. Although beam deflection is independent of velocity of rotation, it can occur with a static, unrotating optical system depending on which MOM is in registration with the beam. Rotation will average or smooth beam nonuniformities caused by lenslet boundaries and other lens imperfections. Moreover, the beam deflection angle (i.e. wobble) is also insensitive to deviations of the rotating optical system from true planar motion.

Figure 9:
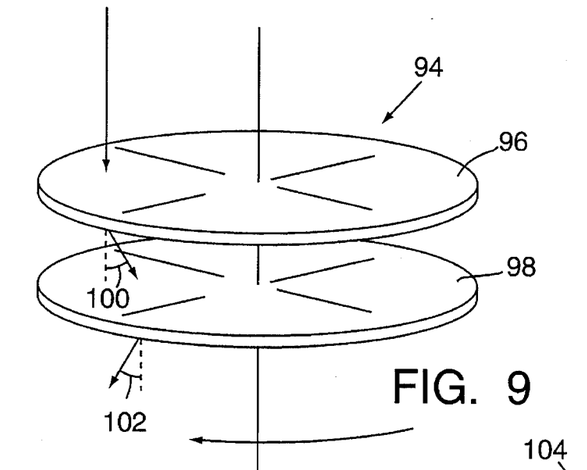
FIG. 9 is a simplified schematic illustration of an alternative optical system provided by the present invention comprising coaxial MOM assemblies.

Pairs of MOM assemblies such as comprise optical system 56 can be used to define regular rays of discretely scanned beam angles to, for example, generate a planar raster motion of an optical beam. One such embodiment is shown with respect to FIG. 9. Disclosed therein is an indexed deflector optical system 94 for raster scanning an input optical beam. The optical system 94 is comprised of coaxial MOM assemblies 96, 98 such as disclosed herein.

Each MOM assembly is comprised of an annular configuration as shown with respect to the optical system of FIG. 5. However, MOM assembly 96 is fabricated to induce a displacement in a first direction 100 of progressively increasing amount while MOM assembly 98 is configured to induce a deflection in a second perpendicular direction 102. In the embodiment shown with respect with FIG. 9, the MOM assembly 96 rotates at a substantially greater speed than does that of MOM assembly 98, thereby generating beam motion corresponding to a conventional raster pattern in an image plane.

Although disclosed in the preferred embodiment to comprise a rectilinear grid of lenslets, those skilled in the art will note that alternative configurations are possible. As shown with respect to FIGS. 10–12, the lenslets may be fabricated for an individual MOM in a matter to induce a uniaxial or alternatively an angular displacement of the input optical beam by a corresponding uniaxial or angular displacement of the output lenslet optic axis with respect to the input lenslet optic axis.

Figure 10:
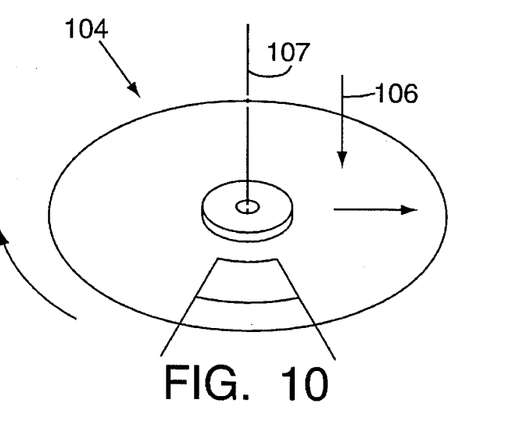
FIG. 10 is an illustration of an optical system provided according to the present invention characterized by angular beam displacement.
Figure 11:
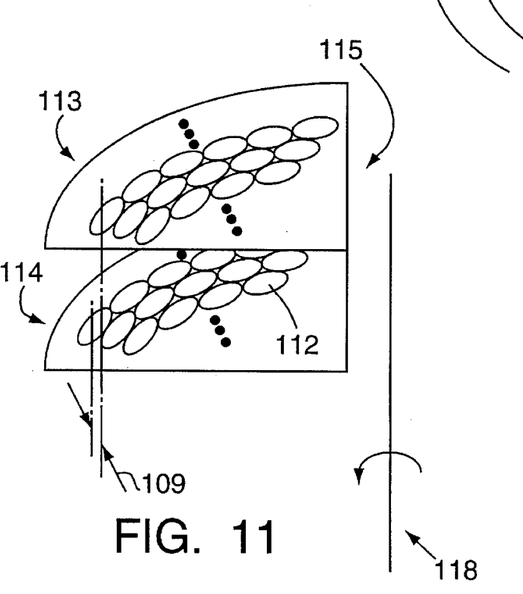
FIG. 11 is a simplified illustration of a portion of an MLM of the optical system of FIG. 10.
Figure 12:
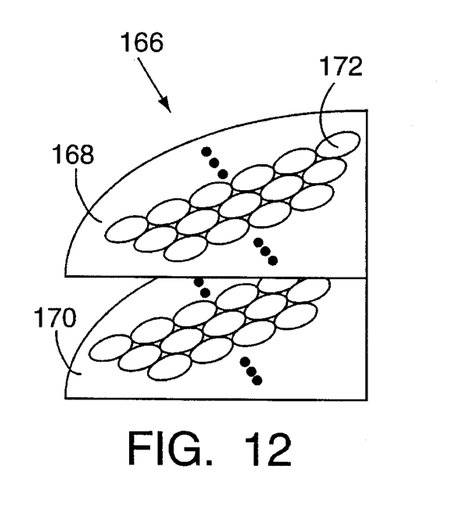
FIG. 12 is a simplified illustration of a portion of an MLM employing an alternate pattern for the optical system of FIG. 10.
Figures 13, 14:
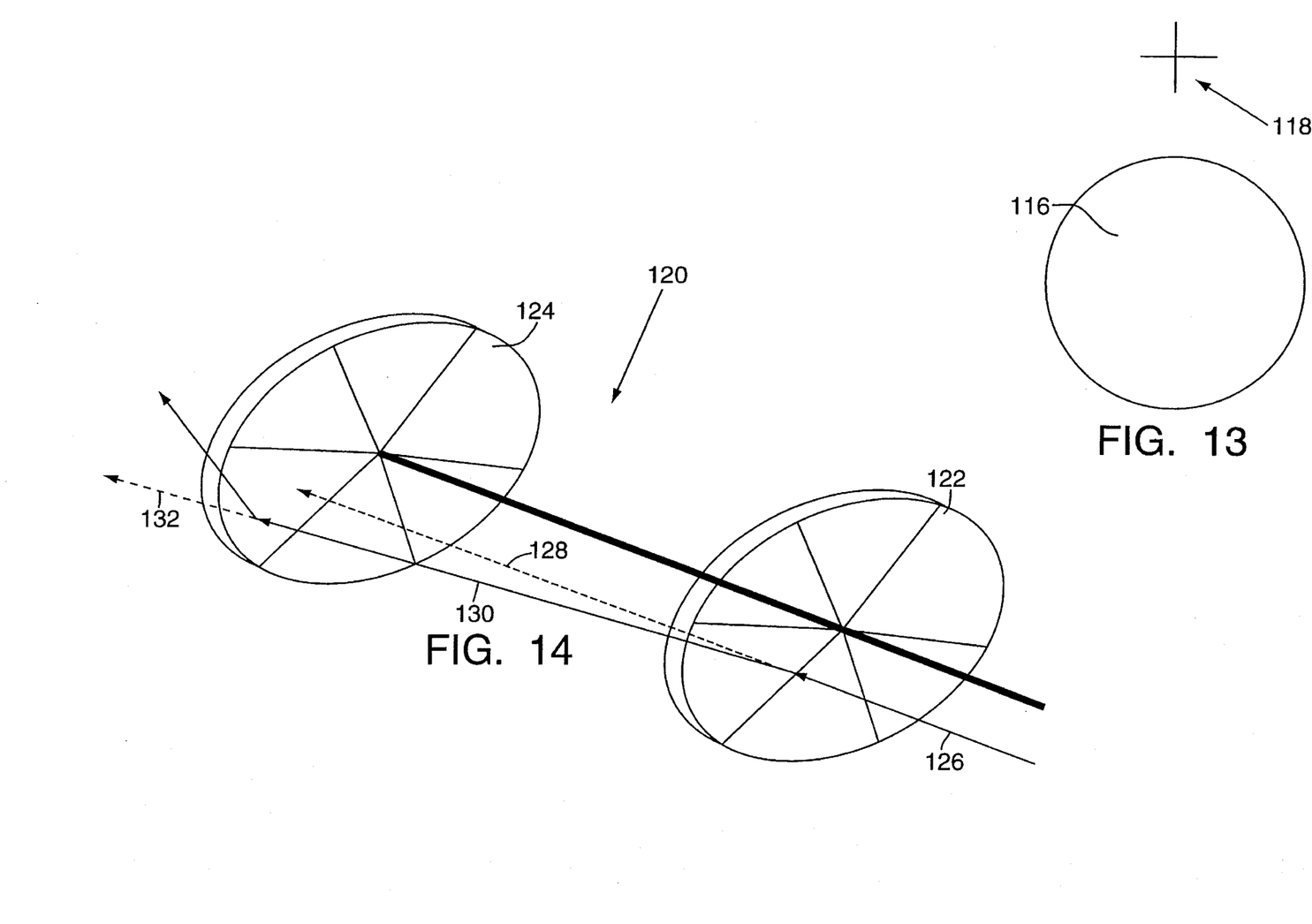
FIG. 13 is a diagrammatic illustration of the path traced by the output beam after one complete revolution of the optical system of FIG. 10.
FIG. 14 is an alternative view of the optical system of FIG. 9.
Figure 20:
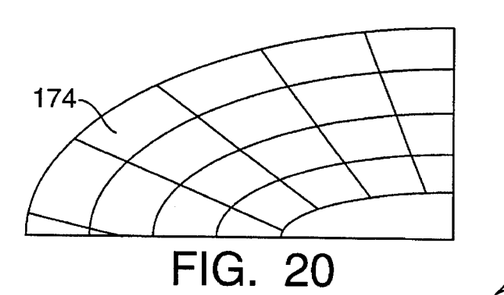
FIG. 20 is a simplified schematic illustration of a grid for an MLM provided according to the present invention characterized by a polar array of lenslets.
Figure 21:
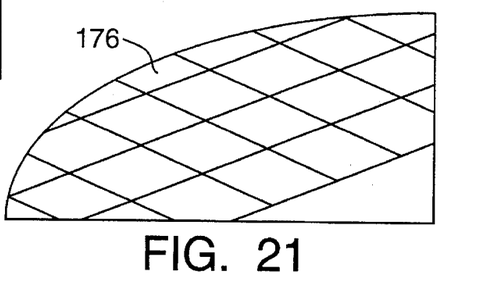
FIG. 21 is a simplified schematic illustration of a grid for an MLM provided according to the present invention characterized by a rectilinear array of lenslets.

In FIG. 10 there is shown a MOM assembly 104 comprised of a pair of MLM's as described above but configured to generate a uniaxial beam deflection. Deflection of an input beam incident along axis 106 is produced by a uniaxial translation of the optic axes of the output lenslets as compared to the input lenslets as the MOM assembly 104 rotates about axis 107. FIG. 11 is a schematic illustration showing portions of MLM's 113, 114 which are on opposing faces of substrate 115, with lenslets 112 of MLM 114 uniformly displaced in one direction by a distance 109. As a result, the input beam traces a circle 116 as seen in FIG. 13 in a region that is displaced from the axis of rotation indicated at 118, but concentric to the input optical beam axis 106. With MOM's shaped as annular sectors wherein a given sector located at a given radius imparts a known deflection different in magnitude but in the same direction as the adjacent sectors, the beam exiting MOM 104 traces a circle of a given diameter in the image plane with the diameter of the circle about axis 106 determined by the radial position of the beam as it intersects the MOM assembly. FIG. 12 explicitly shows another way of fashioning the arrays comprising a MOM, in this case a rectilinear pattern is used. FIG. 12 illustrates an alternative MOM 166 wherein MLM's 168 and 170 are comprised of lenslets 172 arranged in a rectilinear manner. FIGS. 20 and 21 schematically show grids 174 and 176 in which the arrays of lenslets are arranged in the respective MOM's of FIGS. 11 and 12.

FIG. 14 is a simplified schematic illustration, in perspective, of an indexed reflector optical system 120 as provided according to the present invention. The system 120 comprises first and second MOM assemblies 122, 124 comprised of MLM's as detailed herein above. MOM assembly 122 has radial offsets between the input and output MLM's such that an input beam 126 transiting along an axis 128 is displaced radially outward through an angle 130. Thereafter, the beam is received by MOM assembly 124 and undergoes a second angular deflection 132. This deflection is circumferential. As in the case of optical system 94, the MOM assemblies can be rotated at different rates to scan a selected area. One difference between system 120 and system 94 is that the order of deflection is reversed.

Figures 15, 16, 17:
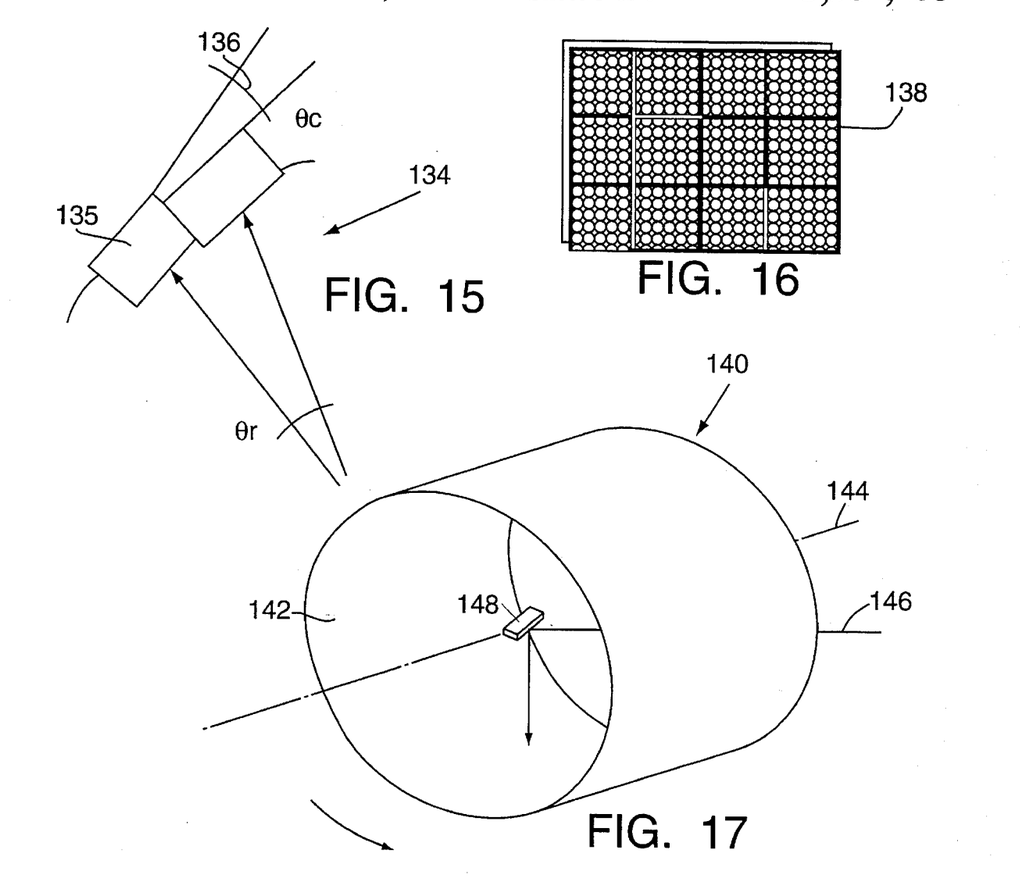
FIG. 15 is a simplified illustration of a portion of an optical system provided according to the present invention displaying output beam displacement error.
FIG. 16 is a simplified schematic illustration of an optical system provided according to the present invention characterized by input beam rastering, effected either by motion of the input beam or by motion of the MOM's.
FIG. 17 is a simplified schematic illustration of a cylindrical optical system of rectilinear MOM's provided according to the present invention.

For MOM assemblies such as the indexed reflector optical system of FIG. 5, the individual MOM's are fabricated with the lenslets are arranged in a rectilinear array. As shown in FIG. 15, this combination of a circular MOM 134 with MLM's 135 having rectilinear lenslet arrays results in a slight displacement error shown as angle 136. The value of the error angle can be reduced by increasing the total number of MOM's and reducing their respective length while positioning them perpendicular to radii. Constructing the MOM with MLM's composed of polar arrays of lenslets as indicated in FIGS. 11 and 20 dramatically reduces the error angle. Alternatively, the MLM's may be arranged in a noncircular, nonrotating structure wherein the input beam is scanned sequentially through an alternative optical system 138 as shown in FIG. 16, thereby generating the desired beam displacement.

A second alternative optical system 140 is shown in FIG. 17. The system 140 is comprised of a sequence of MOM's 142 constructed in the manner detailed hereinabove. However, the MOM's are arranged in a cylinder each with major surfaces whose normal is oriented perpendicular to axis 144. Input beam 146 is provided reflected off of mirror 148 and transits through each MOM as the cylinder is rotated. In the embodiments of FIGS. 16 and 17, the displacement error is completely eliminated. Note further that a second cylindrical MOM assembly can be added exterior to the one illustrated in FIG. 17 to generate supplemental deflections of the beam. Also, the optical system 140 as with those shown with respect to FIGS. 9, 10 and 14 require such additional support and motor means as necessary to perform the functions set forth herein.

Figure 18:
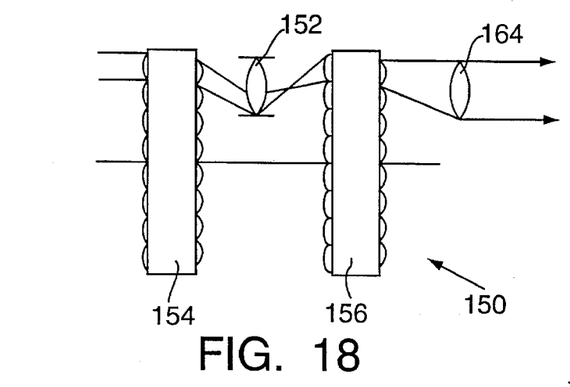
FIG. 18 is an optical system provided according to the present invention characterized by a relay lens.
Figure 19:
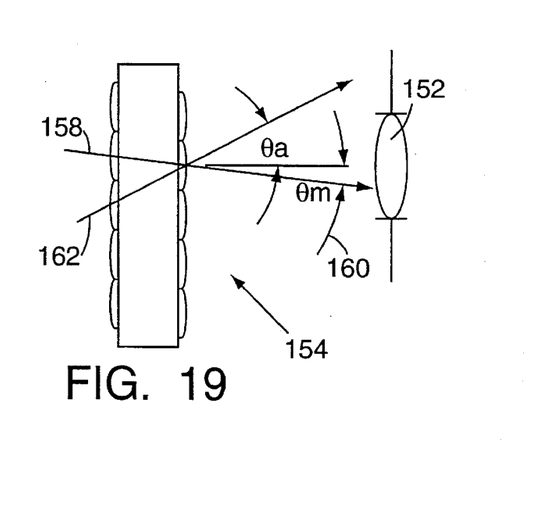
FIG. 19 is a simplified schematic illustration of a portion of the optical system of FIG. 18.

FIG. 18 is a simplified schematic illustration of a portion of an optical system 150 provided according to the present invention characterized by a relay lens 152. The relay lens is chosen to have a focal length approximately one quarter the distance between MOM's 154 and 156 and is equidistant therebetween. The relay lens is surrounded by a field stop that limits the transfer angle of the MOM 154 to eliminate any deflection angle aliasing. As shown in FIGS. 18 and 19, ray 158 passes through MOM 154 at an angle 160 and is just intercepted by relay lens 152. Rays, such as ray 162, subtend a greater angle and are not passed to the output MOM 156. The relay lens therefore allows the use of multiple MOM's in series without beam walk. Also shown in FIG. 18 is a re-collimating lens 164 whose focal length is one quarter of the MOM separation distance for unity magnification. For higher magnification, the focal length of lens 164 should be equal to one-quarter the MOM separation plus the distance from the output MOM to the re-collimating lens.

Similarly, although the invention has been shown and described with respect to a preferred embodiment thereof, it should be understood by those skilled in the art that various other changes, omissions and additions thereto may be made therein without departing from the spirit and scope of the pre-sent invention.

We claim:

1. A micro-optic multiplet (MOM) optical system for deflecting radiation transiting substantially parallel to a radiation optic axis, said system comprising:

a first lenslet array for receiving the radiation including a plurality of first lenslets each having a focal length, a pitch, a lens diameter and a lenslet optic axis substantially parallel to said radiation optic axis;

a second lenslet array including a plurality of second lenslets each having a focal length, a pitch, a lens diameter and a lenslet optic axis substantially parallel to said radiation optic axis, each of said output lenslets having a corresponding input lenslet, each of said second lenslets providing output radiation received from said corresponding input lenslet in collimation and a translation means for providing displacement of said second lenslet array relative to said first lenslet array from a first position wherein said second and corresponding first lenslet optic axes are in registration and said radiation transits through the optical system propagating substantially along said radiation optic axis to a second position wherein said second and corresponding first axes are misregistered and the radiation is deflected from said radiation optic axis to propagate along an output axis forming an angle thereto with magnitude proportional to said displacement while maintaining said output radiation in collimation.

2. The optical system of claim 1 wherein said first and second lenslet arrays each comprise a micro-lens module (MLM).

3. The optical system of claim 1 wherein said input lenslet pitch does not equal said output lenslet pitch in magnitude.

4. The system according to claim 2 wherein said MLM's form an array of Keplerian telescopes wherein said first lenslets form a real image in a first lenslet array image plane.

5. The optical system of claim 3 in which said second lenslet pitch is smaller than said first lenslet pitch and said first and second lenslet arrays are separated by a distance greater than the sum of the respective focal lengths, whereby said incident optical radiation is brought to a focus on said optic axis.

6. The optical system of claim 2 further comprising a field lens positioned along said optic axis between said first and second MLM's in an intermediate image plane transverse to said optic axis.

7. The optical system according to claim 1 further including a field lenslet array having a field focal length, field pitch and field lens diameter, disposed between said first and second lenslet arrays, said first and second lenslet arrays being disposed along said optic axis with respect to said field lenslet array such that said field lenslet array forms an image of said first lenslet array in the plane of said second lenslet array, said first and second lenslet arrays further configured as confocal.

8. The optical system according to claim 1, in which said first and second lenslet arrays are separated by an axial distance substantially equal to the sum of said first and second focal lengths.

9. The system according to claim 2 wherein said MLM's form an array of Galilean telescopes wherein said first and second array lenslets are, respectively, optically diverging and converging.

10. The optical system of claim 2 further comprising third and fourth MLM's respectively having lenslets with a third and fourth foci, pitch and lens diameter, said first and second MLM's and said third and fourth MLM's respectively forming pairs of Galilean telescopes to propagate said radiation therethrough, said second and third MLM's adapted to be displaced relative to said first and fourth MLM's without relative displacement with respect to each other.

11. The optical system of claim 10 wherein said first and fourth MLM's are stationary with respect to one another.

12. The optical system of claim 10 wherein said first and second MLM's have a first pitch and said third and fourth MLM's have a second pitch.

13. The optical system of claim 2 further comprising first and second MOM's, with said first MOM having a first MOM output lenslet optic axis at a reference position registered with a first MOM input lenslet optic axis and second MOM having a second MOM output optic axis translated a fixed distance from said reference position and wherein said translation means further comprises means for relatively moving said input beam from said first MOM to said second MOM whereby the radiation undergoes a deflection of a corresponding selected magnitude.

14. The optical system of claim 13 further comprising a cylindrical MOM assembly having first and second MOM's configured on a surface of a cylinder adapted to receive said radiation from a mirror positioned along a rotational axis and wherein said translating means further comprises a means for rotating said MOM assembly about said rotational axis.

15. The optical system of claim 13 further comprising an annular MOM assembly having first and second MOM's configured in adjacent sectors of a substantially planar annulus and wherein said translating means further comprises a means for rotating said MOM assembly about a rotational axis substantially parallel to said radiation axis.

16. The optical system of claim 15 further comprising first and second annular MOM assemblies with the radiation configured to sequentially transit therethrough, said first MOM assembly comprising MLMs wherein said output lenslet optic axis is positioned to displace the radiation along a first direction and said second MOM assembly comprising MLM's wherein said output lenslet optic axis is positioned to displace the radiation along a second direction, thereby scanning the radiation over an area as said MOM assemblies are relatively translated.

17. The optical system of claim 16 wherein said translation means further comprises means for rotating said first MOM assembly at a higher speed as compared with said second MOM assembly so as to raster said radiation over said area.

18. The optical system of claim 2 further comprising an optically transparent substrate for receiving said first MLM on a first outer surface and said second MLM on an opposed second outer surface.

19. The optical system of claim 2 further comprising a relay lens disposed between said first and second MLM's configured to transmit said radiation therebetween.

20. The optical system of claim 2 further comprising a relay lens array disposed between said first and second MLM's, with each of said relay lenses configured to transmit a portion of said radiation between corresponding input and output lenslets.

21. The optical system of claim 20 further wherein said relay lens array further comprises a field stop array, thereby eliminating deflection angle aliasing.

22. The optical system of claim 20 further comprising a collimating lens array adapted to receive said radiation from said second MLM for collimating said radiation output from the optical system.

23. The optical system of claim 13 wherein said first and second MOM's are deposited on opposed surfaces of respective first and second substrates.

24. The optical system of claim 18 wherein said substrates have a thickness chosen in dependence on the desired optical system focal length.

25. The optical system of claim 13 further comprising a rectilinear MOM assembly comprised of a plurality of MOM's with each of said MOM's translating said output optic axes a fixed distance, respectively, said translating means further including means for rastering said radiation over said MOM assembly.

26. The optical system of claim 13 wherein said MOM's translate said radiation radially as compared to an origin.

27. The optical system of claim 13 wherein said MOM's translate said radiation angularly as compared to an origin.

28. The optical system of claim 14 further comprising a second cylindrical MOM assembly coaxial with said first cylindrical MOM assembly, said first MOM assembly comprising MLMs wherein said output lenslet optic axis is positioned to displace the radiation along a first direction, and said second MOM assembly comprising MLM's wherein said output lenslet optic axis is positioned to displace the radiation along a second direction, thereby scanning the radiation over an area as said MOM assemblies are rotated.

29. The optical system of claim 28 wherein said translation means further comprises a means for rotating said first cylindrical MOM assembly at a higher rate of speed than said second cylindrical MOM assembly.

30. A method for deflecting radiation transiting substantially parallel to a radiation optic axis in a microptic multiplet (MOM) optical system, said method comprising the steps of:

receiving the radiation at a first lenslet array that includes a plurality of first lenslets each having a focal length, a pitch, a lens diameter and a lenslet optic axis substantially parallel to said radiation optic axis;

outputting the radiation in collimation through a second lenslet array that includes a plurality of second lenslets each having a focal length, a pitch, a lens diameter and a lenslet optic axis substantially parallel to said radiation optic axis, each of said second lenslets having a corresponding first lenslet; and displacing said second lenslet array relative to said first lenslet array from a first position wherein said second and corresponding first lenslet optic axes are in registration and said radiation transits through the optical system propagating substantially along said radiation optic axis to a second position wherein said second and corresponding first axes are misregistered and the radiation is deflected from said radiation optic axis to propagate along an output axis parallel thereto by an amount proportional to the separation between said first and second positions while maintaining said output radiation in collimation.

31. The method of claim 30 further comprising the steps of:

providing a MOM assembly including plurality of MOM's each having first and second MLM's;

fixing each of said second MLM's at a position selected to provide a predetermined radiation deflection; and moving said radiation relative to said MOM assembly.

32. The optical system of claim 1 wherein said translation means further includes a means for moving said second lenslet array from said first position to said second position.

* * * * *